(No Model.) 2 Sheets—Sheet 1.
M. BURKLEY.
STEAM ENGINE.
No. 333,920. Patented Jan. 5, 1886.
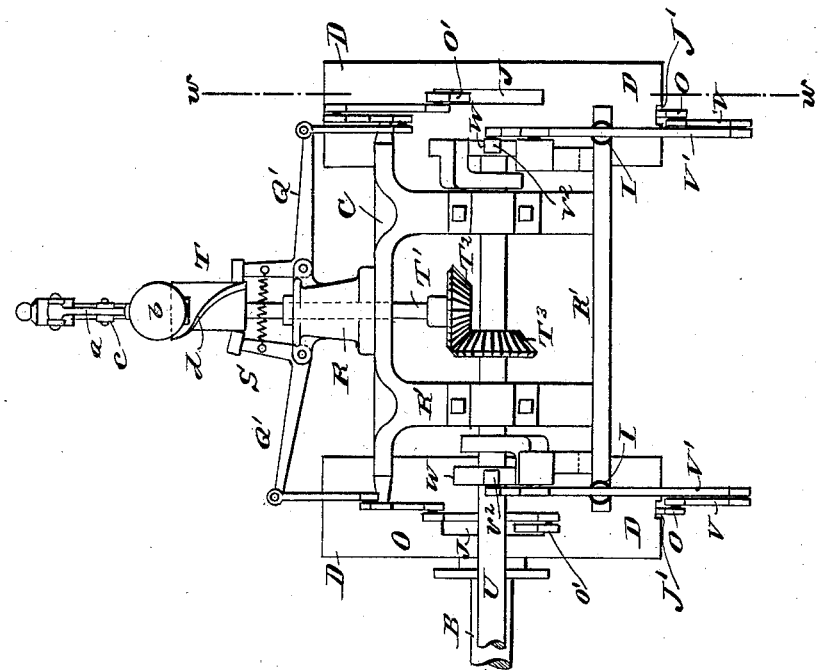
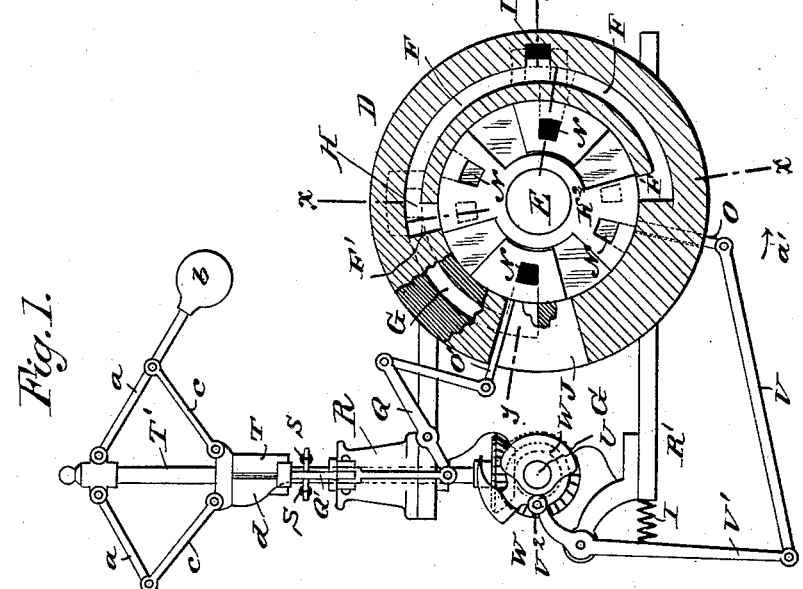
WITNESSES:
Otto Berger
C. Sedgwick
INVENTOR:
M. Burkley
BY Munn & Co
ATTORNEYS.

(No Model.)  2 Sheets—Sheet 2.
M. BURKLEY.
STEAM ENGINE.
No. 333,920. Patented Jan. 5, 1886.
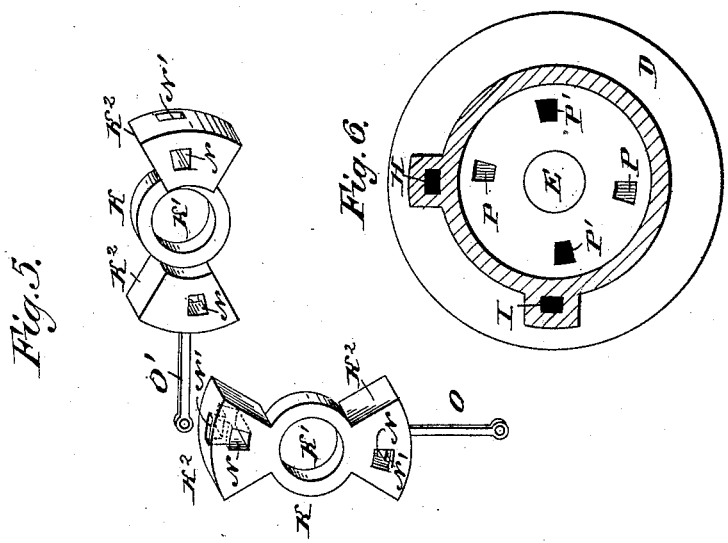
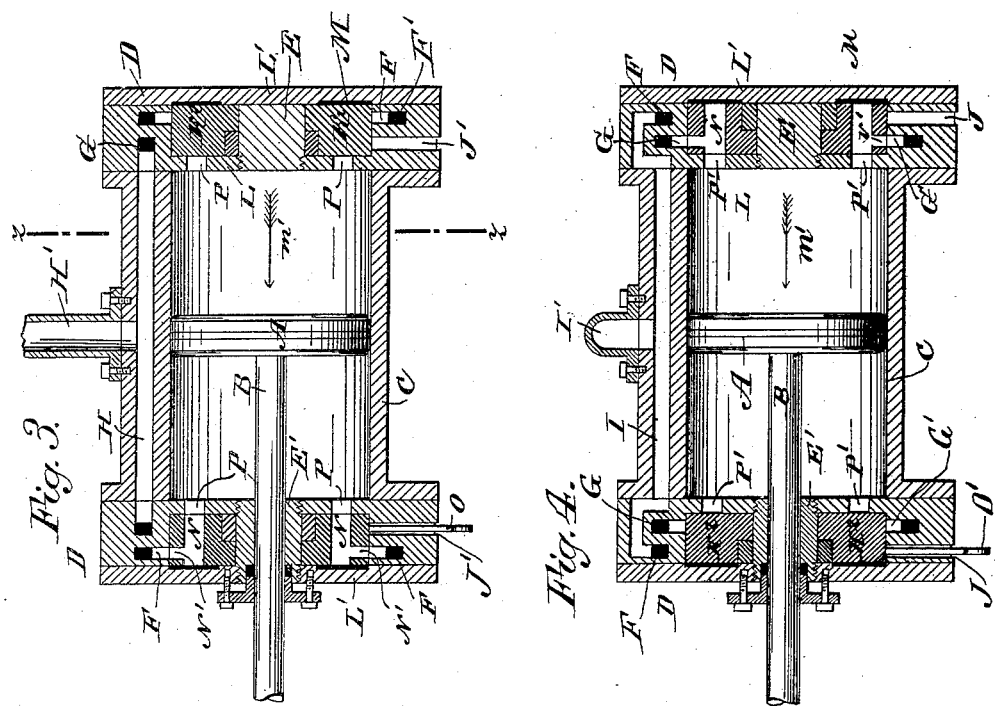
WITNESSES:
Otto Beyer
C. Sedgwick
INVENTOR:
M. Burkley
BY Munn & Co
ATTORNEYS.

UNITED STATES PATENT OFFICE.

MARTIN BURKLEY, OF MOLINE, ILLINOIS.

STEAM-ENGINE.

SPECIFICATION forming part of Letters Patent No. 333,920, dated January 5, 1886.

Application filed March 23, 1885. Serial No. 159,779. (No model.)

*To all whom it may concern:*

Be it known that I, MARTIN BURKLEY, of Moline, in the county of Rock Island and State of Illinois, have invented a new and Improved Steam-Engine, of which the following is a full, clear, and exact description.

The object of my invention is to provide certain new and useful improvements in steam-engines, whereby the construction is greatly simplified, and the engine is made to work easily and to great advantage.

The invention consists in the combination, with a cylinder having two diametrically-opposite inlet and two diametrically-opposite outlet openings at each end, of rocking valves on the ends of the cylinder, which rocking valves are fitted in pairs upon a common axis and alternately close the outlet and inlet openings, and are operated from the working parts of the engine.

The invention also consists in the arrangement, construction, and combination of parts and details, as will be fully set forth and described hereinafter.

Reference is to be had to the accompanying drawings, forming part of this specification, in which similar letters of reference indicate corresponding parts in all the figures.

Figure 1 is a cross-section on the line $w\ w$ in Fig. 2 of a steam-engine provided with my improvements. Fig. 2 is a side view of the cylinder and my improved valve-actuating device. Fig. 3 is a longitudinal section of the cylinder on the line $x\ x$, Fig. 1, showing the exhaust-ports open at one end; and Fig. 4 is a longitudinal section of the same on the line $y\ y$, Fig. 1, and showing the steam-ports open at the opposite end. Fig. 5 shows the valve in perspective view. Fig. 6 is a cross-section on the line $z\ z$, Fig. 3.

The piston A on the piston-rod B works in the cylinder C, provided at each end with a short cylindrical chamber, D, the diameter of the casings of which is somewhat greater than that of the cylinder.

In the middle of one cylindrical chamber, D, a solid cylindrical plug or hub, E, is held, and in the middle of the other a tubular plug or hub, E', is arranged, through which the piston-rod B passes.

In each cylindrical chamber D a semicircular steam-channel, F, is arranged, provided at the ends with short channels F', which extend to the inner rim or surface of the chamber. Each compartment or chamber D is also provided with another semicircular channel, G, and the channels G', arranged in a plane parallel with the channel F, the channels G being arranged nearer the inner sides and the channels F nearer the outer sides of the compartments, as shown in Figs. 3 and 4. The channels G of the two compartments or chambers D are connected by a channel, H, in the casing, with a steam-supply pipe, H', and the two channels F in the two compartments are connected by a channel, I, with the exhaust-pipe I'. The ends of the channel I are carried over the channels G in the manner shown in Fig. 4, or in any other suitable manner so that the channels do not interfere.

Each compartment D is provided with a recess, J, in its side, and a corresponding recess, J', in the bottom, for a purpose that will be set forth hereinafter. In each compartment two valves, K, are arranged, which are formed of a ring, K', and two wedge-shaped lugs, K², diametrically opposite each other, and having their outer edges rounded in such a manner as to fit snugly within the chambers or compartments D, and to rock in the same, the said rings K' being mounted on the hubs E and E'. The rings K' are half the thickness of the lugs K², so that when the rings are placed together the inner concaved edges of the lugs K² of one valve will slide on the outer edge of the ring K' of the other valve, the side faces of the lugs of both valves being flush, and fitting snugly between the outer heads, L', and inner heads, L, of the compartments D. Packing-rings M are placed on the inner surfaces of the outer heads, L', in such a manner that the lugs K² of the valves can work on the said packing-rings. In each lug a transverse aperture, N, is provided, from which an aperture, N', extends to the outer end of the rim of the lug. The exhaust-valve has an arm, O, on one end, which arm projects through the bottom recess, J', of the compartment, and the steam-inlet valve has an arm, O', which projects through the side recess, J, as shown in Fig. 1.

In the inner plate, L, of each compartment, which inner plates form the ends of the cylinders, four apertures, P P and P' P', are arranged a quadrant from each other. The arm O' is connected with a pivoted lever, Q, which in turn is connected with an elbow-lever, Q', pivoted on the neck R of the frame R'. The upwardly-projecting shanks of the levers Q' are connected by a spring, S, which pulls them against the cam T, mounted loosely on a vertical shaft, T', driven by bevel-gears $T^2$ and $T^3$ from the shaft U, which is operated by suitable gearing from the main shaft. Arms $a$ are pivoted on the upper end of the shaft T', which have balls $b$ on the outer ends, and are connected by rods $c$ with the cam T. The cam T is provided with a spiral ridge, $d$, whereby a greater diameter is given to the upper part of the cam than to the lower part. The lever O is connected by a connecting-rod, V, with a pivoted lever, V', provided at its top with a roller, $V^2$, which rests against a cam-wheel, W, mounted on the shaft U. A spring, I, interposed between the frame R' and the lever V', presses the roller $V^2$ against the cam-edge of the cam-wheel W.

The operation is as follows: When the shaft U revolves, its cam W, acting on the lever V', swings the lower end of the arm O in the direction of the arrow $a'$. The cam T, acting on the ends of the levers Q, presses the upper ends of the same from each other, and they are then drawn together by the spring S, whereby the levers Q are rocked and rock the arm O' up and down. The arms O and O' swing at the same time. When the inlet-valves are swung in such a position as to register with the inlet-apertures P' P', the exhaust-valve is swung in such a position as to close the exhaust-apertures P P. For example, in Fig. 3 the piston is moving in the direction of the arrow $m'$—that is, from right to left—and at the left-hand end of the cylinder the exhaust-valve K is in such a position that its apertures N register with the apertures P P, and its apertures N' register with the short channels F', leading to the exhaust-channel F in the left-hand compartment D. At the same time the exhaust-ports P P at the right-hand end of the cylinder are closed by the valves K at the right-hand end of the cylinder, as shown in Fig. 3. At the left-hand end of the cylinder the steam-inlet ports P' P' are closed by the steam-inlet valve K, as shown in Fig. 4, and at the right-hand end of the cylinder the steam-inlet ports P' P' register with the apertures N of the steam-inlet valve at the right-hand end of the cylinder, and the apertures N' in the steam-inlet valve at the right-hand end of the cylinder register with the steam-inlet channels G' G in the right-hand compartment, D. The steam thus passes from the pipe H' to the channel H, the channel G, the apertures N' N into the cylinder, and forces the piston in the direction of the arrow $m'$, exhaust-steam passing out through the apertures P P at the left-hand end of the cylinder, through the apertures N and N' in the exhaust-valve at the left-hand end of the cylinder, the channel F, and out through the exhaust-pipe. When the piston has arrived at the left-hand end of the cylinder, the valves are shifted, the valves at the left-hand end of the cylinder being shifted so that the exhaust-ports P P at the left-hand end of the cylinder are closed and the inlet-ports P' P' are opened, and the valves at the right-hand end of the cylinder being shifted in such a manner that the exhaust-ports P P are opened and the inlet-ports P' P' are closed. The piston is then moved in the inverse direction of the arrow $m'$, and so on alternately. At the end of each stroke in each direction the positions of the valves at the ends of the cylinder are reversed. When the engine runs very fast, the balls $b$ swing from each other and raise the cam-sleeve T, which, as it has a spiral shoulder, acts a shorter time on the levers Q', and thus permits the spring S to pull the upper ends of the levers Q' together sooner, whereby the steam-inlet valves are held open a shorter time, thus causing the engine to run slowly or at its normal speed. When the engine moves too slowly, the balls swing toward each other, and the cam T acts on the levers Q' in such a manner as to keep the inlet-valves open a longer time and admit more steam.

Having thus described my invention, what I claim as new, and desire to secure by Letters Patent, is—

1. A steam-engine having valves arranged in each head of the cylinder, and fitted in pairs upon a common axis for simultaneous alternate action, substantially as herein shown and described.

2. A steam-engine having steam inlet and outlet ports in the ends or heads of the cylinders, and valves arranged to rock on the said heads or ends, and fitted in pairs upon a common axis for simultaneous alternate action, substantially as herein shown and described.

3. The combination, with a steam-engine cylinder, of two rocking valves on each end or head, two of said valves being connected by levers to spring-connected elbow-levers acted upon by the governor, substantially as herein shown and described.

4. The combination, with a steam-engine cylinder having two diametrically-opposite exhaust-ports and two diametrically-opposite inlet-ports at each end, of two valves arranged to rock on each end, two of said valves being connected to spring-acted-upon levers actuated by cams upon the operating-shaft, substantially as herein shown and described.

5. The combination, with a cylinder having valves on each end or head, of a cam for operating one valve on each head and a centrifugal governor for controlling the action of the other valves, said cam being arranged upon the shaft geared to the governor-shaft, substantially as herein shown and described.

6. The combination, with a steam-engine cylinder having a compartment formed on each end or head, in which compartments steam-channels are arranged, of two valves arranged to rock in each compartment, two of said valves being connected by levers to spring-connected elbow-levers actuated by a cam adjustable by the governor, substantially as herein shown and described.

7. The combination, with a steam-engine cylinder having a compartment in each end, of two valves arranged in each compartment, and arms projecting from the valves, which arms are connected, two by levers to spring-connected elbow-levers actuated by a cam adjustable by the governor, the remaining two arms being connected by spring-acted-upon levers actuated by cams upon a driven shaft, substantially as herein shown and described.

8. In a steam-engine, the combination, with a cylinder having the two diametrically-opposite exhaust-ports P P and the inlet-ports P' P' at each end, of two valves, K, each formed of a ring, K', and the opposite lugs K², provided with the apertures N and N', said valves being arranged upon a common axis, with the inner concaved ends of their lugs projecting at one side beyond their rings, arranged in the manner substantially as shown and described.

9. The combination, with a cylinder having a compartment at each end, with each of which compartments a channel for live steam and a channel for exhaust-steam are arranged, which channels in each compartment are parallel, and have connection with the cylinder-chamber by short channels extending to the inner rim of the cylinder-chamber, which compartments are each in communication with the corresponding ends of the cylinder by two outlet and two inlet ports, of two valves, K, arranged in each compartment, the valves being each formed of a ring, K', and two opposite lugs, K², having apertures N N' arranged in the sides and ends of said lugs, substantially as herein shown and described.

MARTIN BURKLEY.

Witnesses:
MATTHEW NEWLOVE,
JOHN TRACEY.